United States Patent
Okamoto et al.

(10) Patent No.: US 6,956,092 B2
(45) Date of Patent: Oct. 18, 2005

(54) POLY (METH) ACRYLAMIDE WITH A HIGH STEREOREGULARITY AND PROCESS FOR PRODUCING THE SAME

(75) Inventors: Yoshio Okamoto, Aichi (JP); Yutaka Isobe, Aichi (JP)

(73) Assignee: Daicel Chemical Industries, Ltd., Osaka (JP)

( * ) Notice: Subject to any disclaimer, the term of this patent is extended or adjusted under 35 U.S.C. 154(b) by 31 days.

(21) Appl. No.: 10/467,222

(22) PCT Filed: Apr. 25, 2002

(86) PCT No.: PCT/JP02/04159
§ 371 (c)(1),
(2), (4) Date: Aug. 5, 2003

(87) PCT Pub. No.: WO02/088204
PCT Pub. Date: Nov. 7, 2002

(65) Prior Publication Data
US 2004/0077812 A1 Apr. 22, 2004

(30) Foreign Application Priority Data
Apr. 27, 2001 (JP) .......................... 2001-131870

(51) Int. Cl.$^7$ .............................. C08F 120/54
(52) U.S. Cl. .................. 526/303.1; 526/90; 526/123.1; 526/304; 526/305; 526/307
(58) Field of Search ............... 526/90, 123.1, 526/303.1, 304, 305, 307, 124.2

(56) References Cited

U.S. PATENT DOCUMENTS

| 5,668,234 | A | * | 9/1997 | Rhodes et al. ............... 526/329 |
| 5,854,364 | A | | 12/1998 | Senninger et al. |
| 6,566,469 | B1 | * | 5/2003 | Kaplan et al. ............... 526/229 |
| 6,762,260 | B2 | * | 7/2004 | Sonnenschein et al. ..... 526/196 |

FOREIGN PATENT DOCUMENTS

JP    10-195136    7/1998

OTHER PUBLICATIONS

Stereospecific Radical Polymerization of N–Methyl Methacrylamide, Polymer Journal, vol. 32, No. 8, pp 694–699 (2000).
Asymmetric Anionic Polymerization of Alkyl–Substituted N,N–Diphenylacrylamide Derivatives, Polymer Journal, vol. 30, No. 3, pp 249–255 (1998).
Stereospecific Anionic Polymerization of N,N–Dialkylacrylamides, Macromolecules, 32, pp 6466–6477 (1999).

\* cited by examiner

*Primary Examiner*—Helen L. Pezzuto
(74) *Attorney, Agent, or Firm*—Flynn, Thiel, Boutell & Tanis, PC

(57) ABSTRACT

The present invention provides a novel high-molecular substance having a unique function and a process for producing the same. That is, it is a poly(meth)acrylamide which has a syndiotacticity of 50% or lower and is highly isotactic or heterotactic. The poly(meth)acrylamide is obtained by radical-polymerizing an acrylamide or methacrylamide in the presence of a Lewis acid catalyst.

9 Claims, No Drawings

POLY (METH) ACRYLAMIDE WITH A HIGH STEREOREGULARITY AND PROCESS FOR PRODUCING THE SAME

TECHNICAL FIELD TO WHICH THE INVENTION BELONGS

The present invention relates to a poly(meth)acrylamide having a high isotacticity or heterotacticity and a process for producing the same.

PRIOR ART

In vinyl polymers, high molecular substances with a main chain having a high stereoregularity have unique and high functions. They have a high crystallinity, undergo a small change in properties, such as modulus of elasticity, expansion coefficient, and refractive index, at the glass transition temperature, and have a low light scattering property so that they have an excellent transparent feeling. Accordingly, they are expected to be functional materials that can be applied to various applications and attention has been focused on their development.

The term "tacticity", which expresses the stereoregularity of a high molecular substance quantitatively, includes three kinds of tacticity: mm (isotactic), mr (or rm, heterotactic), and rr (syndiotactic) as expressed in terms of triad tacticity that distinguishes differences in the distribution state of the steric configuration along the polymer chain. It is often the case that high molecular substances having the same composition differ greatly in physical properties due to a difference in the distribution of the kinds of tacticity. For this reason, in functional materials that are desired to be applied to various applications and development thereof, it has been desired to develop a polymerization method that enables one to make a product with a desired distribution of these tacticities.

On the other hand, acrylamide or methacrylamide (hereinafter, referred to as "(meth)acrylamide"), which are widely used polymerizable monomers, give rise to only high molecular substances that are syndiotactic dominant (Polymer J., Vol 32, No. 8, 694–699, 2000) in a radical polymerization method, which is the simplest and generally used polymerization method and no method has been known yet for obtaining high molecular substances having isotactic or heterotactic dominant stereoregularity.

Under the circumstances, an object of the present invention is to provide a novel high molecular substance having a unique function and a process for producing the same.

DISCLOSURE OF THE INVENTION

To achieve the above-mentioned object, the inventors of the present invention have made extensive research and as a result they have accomplished the present invention.

Therefore, according to the present invention, there is provided a poly(meth)acrylamide which is rich in isotacticity or heterotacticity, having a syndiotacticity of not more than 50%, and a process for producing the same.

DETAILED DESCRIPTION OF THE INVENTION

Hereinbelow, an embodiment of the present invention will be described in detail.

As a (meth)acrylamide constituting a poly(meth) acrylamide, a (meth)acrylamide represented by the general formula (I) is preferable and an optically active one is especially preferable:

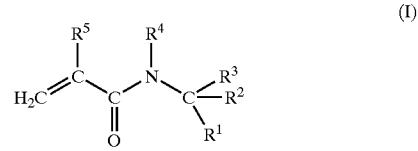

(wherein $R^1$, $R^2$ and $R^3$, which may be the same as or different from one another, represent a hydrogen atom, a monovalent hydrocarbon group having 1 to 30 carbon atoms, or a monovalent atomic group including a heteroatom, $R^4$ represents a hydrogen atom or a monovalent hydrocarbon group having 1 to 30 carbon atoms, and $R^5$ represents a hydrogen atom or a methyl group).

In the (meth)acrylamide represented by the general formula (I) described above according to the present invention, $R^1$, $R^2$, $R^3$ and $R^4$ have the meanings as described above. Specifically, $R^1$, $R^2$ and $R^3$, which may be the same as or different from one another, represent a hydrogen atom, an alkyl group having 1 to 6 carbon atoms, an aryl group such as a phenyl group, an aralkyl group such as a benzyl group or a diphenylmethyl group, a carbalkoxy group having an ester bond such as a carbomethoxy group, a carbamoyl group having an amide bond, an amino-substituted alkyl group such as a dimethylaminomethyl group, an amino group such as a dimethylamino group, an alkoxy-substituted alkyl group such as a methoxymethyl group, an alkoxy group such as a methoxy group, or a silyl group such as a trimethylsilyl group or the like. Those in which $R^1$, $R^2$ and $R^3$ represent different groups are preferable. $R^4$ represents a hydrogen atom or an alkyl group having 1 to 6 carbon atoms, an aryl group such as a phenyl group, or an aralkyl group such as a benzyl group, or a diphenyl methyl group, with a hydrogen atom being preferable.

As a poly(meth)acrylamide which is rich in isotacticity or heterotacticity according to the present invention, a poly (meth)acrylamide mainly including a constituent unit represented by the general formula (II):

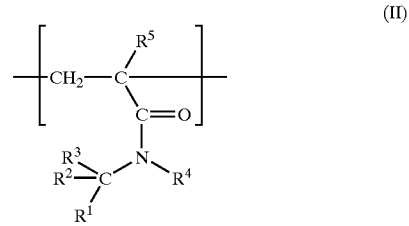

(wherein $R^1$, $R^2$ $R^3$ $R^4$ and $R^5$ have the same meanings as described above) and having a degree of polymerization of 5 or more, especially, 20 to 1000, is preferable.

Such a poly(meth)acrylamide of the present invention can be obtained by radical polymerization of a (meth) acrylamide, preferably the (meth)acrylamide represented by the general formula (I) described above, in the presence of a Lewis acid catalyst by using a radical polymerization initiator such as AIBN (azobisisobutyronitrile). In particular, use of an optically active form as the (meth)acrylamide represented by the general formula (I) is preferred since optically active poly(meth)acrylamide can be obtained.

The Lewis acid used herein is desirably a metal Lewis acid, which is a metal salt (MX). As the metals, typical elements represented by alkali metals and alkaline earth metals, transition metals, lanthanoid metals, and actinoid metals of group 3 to group 12 in the periodic table are selected. As the anion, halogen anions such as chlorine ion and bromine ion and atomic group anions such triflate anion are desirable.

Examples of the preferred metal Lewis acid in the present invention include scandium triflate, yttrium triflate, magnesium bromide, hafnium chloride, ytterbium triflate, and lutetium triflate.

The polymerization reaction may be performed under solvent-less conditions in the case where the (meth)acrylamide is a liquid at room temperature and at atmospheric pressure. On the other hand, the reaction solvent that is used in the case where the (meth)acrylamide is a solid may be any ordinary organic solvent having no radical-trapping effect. More desirably, tetrahydrofuran, chloroform, methanol and the like may be used.

The concentration of the raw material monomer when the polymerization reaction is performed is within the range of 0.1 mmol/L (solvent) to solvent-less conditions. A suitable monomer concentration when the polymerization is performed in a reaction solvent is within the range of 5 mmol/L (solvent) to 5 mol/L (solvent). On the other hand, the radical polymerization initiator may be used in a concentration within the range of 0.001 mmol/L (reaction mixture) to 10 mol/L (reaction mixture), desirably within the range of 0.2 mmol/L (reaction mixture) to 2 mol/L (reaction mixture). The addition amount of the Lewis acid is preferably within the range of 2 mmol/L (reaction mixture) to 2 mol/L (reaction mixture).

The poly(meth)acrylates of the present invention are useful as an optical resolution agent and, at the same time, also useful as a functional material for liquid crystals, nonlinear optical materials, or the like.

According to the present invention, control of the stereoregularity by radical polymerization that has been difficult conventionally becomes easy and the obtained poly(meth)acrylamide can be applied to various fields such as optical resolution agents, liquid crystals, or nonlinear optical materials.

EXAMPLES

Hereinafter, the present invention will be described in detail by examples. However, the present invention should not be considered as being limited to these examples.

Synthesis Example 1

Synthesis of Optically Active Methacrylamide (1) Having an (R) Configuration

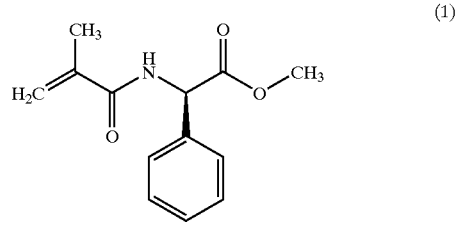

(1)

In a nitrogen exchanged reaction vessel was charged (R)-(−)-phenylglycine methyl ester hydrochloride (15.6 g) and dry diethyl ether (250 ml) and triethylamine (22.2 ml) were added thereto. The mixture was stirred in an ice bath until dissolution. Thereafter, methacryl chloride (8.47 ml) diluted with dichloromethane (50 ml) was dripped therein in 2 hours. Then the temperature was returned to room temperature and stirring was performed for 24 hours.

After the reaction mixture was washed with a saturated aqueous sodium hydrogen carbonate solution and then with distilled water, the obtained organic layer was dehydrated and the solvent was distilled off under a reduced pressure to obtain a crude product. This was recrystallized from hexane/ethyl acetate (8:1) to obtain the objective compound (1) (white needle-like crystal: 11.1 g, percent yield: 63.2%).

The melting point, optical rotation and elemental analysis value of the obtained compound are shown below.

Melting point: 86.5±0.2° C.

Optical rotation: $[\alpha]^{25}_{365}$=−531°, $[\alpha]^{25}_{D}$, =−140° (THF, c=1.0)

Elemental analysis values: Calculated (%): C 66.94%, H 6.48%, N 6.01% Found (%): C 66.94%, H 6.44%, N 6.08%

Synthesis Example 2

Synthesis of an Optically Active Methacrylamide (2) Having an (S) Configuration

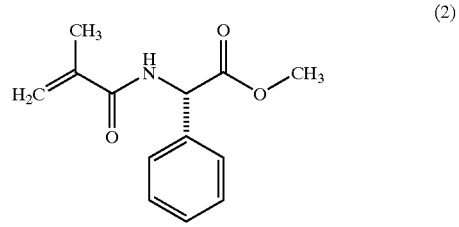

(2)

In a nitrogen exchanged reaction vessel was charged (S)-(+)-phenylglycine methyl ester hydrochloride (15.6 g) in place of (R)-(−)-phenylglycine methyl ester hydrochloride and the subsequent operations were performed in quite the same manner as in Synthesis Example 1 to obtain the objective compound (2).

Synthesis Example 3

Synthesis of a Methacrylamide (3) as a Racemic Form

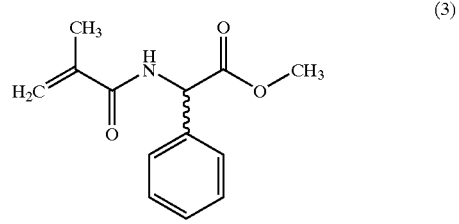

(3)

In a nitrogen exchanged reaction vessel was charged phenylglycine methyl ester hydrochloride having a racemic form (15.6 g) in place of (R)-(−)-phenylglycine methyl ester hydrochloride and the subsequent operations were performed in quite the same manner as in Synthesis Example 1 to obtain the objective compound (3).

Example 1

Polymerization of an Optically Active Methacrylamide (1) Having an (R) Configuration Under a nitrogen atmosphere, in an ampoule were charged 500 mg of methacrylamide (1) and 13.1 mg of AIBN, which was a polymerization initiator, and several kinds of a Lewis acid as a catalyst shown in Table 1 were charged, in predetermined amounts described there and 4.0 ml of tetrahydrofuran was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polymethacrylamide. The triad tacticity (mm/mr/rr) as an index showing the stereoregularity was obtained by measurement by $^{13}$C-NMR in a solvent of DMSO-$d_6$ at 80° C. The results are shown in Table 1.

Example 2

Polymerization of an Optically Active Methacrylamide (2) Having an (S) Configuration Under a nitrogen atmosphere, in an ampoule were charged 500 mg of methacrylamide (2) and 13.1 mg of AIBN, which was a polymerization initiator, and a Lewis acid as a catalyst shown in Table 1 was charged in predetermined amounts described there and 4.0 ml of tetrahydrofuran was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polymethacrylamide. The triad tacticity (mm/mr/rr) as an index showing the stereoregularity was obtained by measurement by $^{13}$C-NMR in a solvent of DMSO-$d_6$ at 80° C. The results are shown in Table 1.

Example 3

Polymerization of a Methacrylamide (3) as a Racemic Form

Under a nitrogen atmosphere, in an ampoule were charged 500 mg of methacrylamide (3) and 13.1 mg of AIBN, which was a polymerization initiator, and a Lewis acid as the catalyst shown in Table 1 was charged in predetermined amounts described there and 4.0 ml of tetrahydrofuran was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polymethacrylamide. The triad tacticity (mm/mr/rr) as an index showing the stereoregularity was obtained by measurement by $^{13}$C-NMR in a solvent of DMSO-$d_6$ at 80° C. The results are shown in Table 1.

Comparative Example 1

Polymerization of an Optically Active Methacrylamide (1) Under the Condition that a Lewis Acid does not Exist Under a nitrogen atmosphere, in an ampoule were charged 500 mg of methacrylamide (1) and 13.1 mg of AIBN, which was a polymerization initiator, and without a Lewis acid being added, 4.0 ml of chloroform was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polymethacrylamide. The triad tacticity (mm/mr/rr) as an index showing the stereoregularity was obtained by measurement by $^{13}$C-NMR in a solvent of DMSO-$d_6$ at 80° C. The results are shown in Table 1.

Comparative Example 2

Polymerization of an Optically Active Methacrylamide (1) Using Dimethyl Dichlorosilane Under a nitrogen atmosphere, in an ampoule were charged 500 mg of methacrylamide (1) and 13.1 mg of AIBN, which was a polymerization initiator, and 43.5 mg of dimethyl dichlorosilane as a catalyst was charged and 4.0 ml of chloroform was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polymethacrylamide. The triad tacticity (mm/mr/rr) as an index showing the stereoregularity was obtained by measurement by $^{13}$C-NMR in a solvent of DMSO-$d_6$ at 80° C. The results are shown in Table 1.

TABLE 1

|  | Catalyst | Charge amount[a] (mol/L) | Yield[b] (%) | $Mn^{[c]} \times 10^{-4}$ | $Mw/Mn^{[c]}$ | Triad tacticity[d] mm/mr/rr |
|---|---|---|---|---|---|---|
| Example 1 | Yb(OTf)$_3$ | 0.09 | 82.3 | 1.23 | 2.72 | 52/39/9 |
|  | Y(OTf)$_3$ | 0.10 | 64.0 | 1.37 | 2.20 | 50/42/8 |
|  | Lu(OTf)$_3$ | 0.13 | 67.2 | 2.13 | 2.68 | 49/38/13 |
|  | MgBr$_2$ | 0.12 | 70.4 | 2.82 | 4.55 | 24/63/13 |
|  | Sc(OTf)$_3$ | 0.12 | 74.9 | 1.38 | 2.10 | 32/53/16 |
|  | HfCl$_4$ | 0.13 | 43.8 | 0.81 | 1.71 | 25/46/29 |
| Example 2 | Yb(OTf)$_3$ | 0.10 | 73.3 | 2.08 | 2.79 | 53/36/11 |
| Example 3 | Yb(OTf)$_3$ | 0.11 | 73.1 | 2.11 | 2.15 | 56/36/8 |
| Comparative Example 1 | Nothing | — | 67.5 | 1.28 | 1.83 | 4/32/64 |
| Comparative Example 2 | Me$_2$SiCl$_2$ | 0.11 | 49.4 | 1.46 | 1.65 | 4/30/66 |

TABLE 1-continued

| Catalyst | Charge amount[a] (mol/L) | Yield[b] (%) | Mn[c] × 10⁻⁴ | Mw/Mn[c] | Triad tacticity[d] mm/mr/rr |
|---|---|---|---|---|---|

[a] Catalyst charge amount per 1 L of reaction solvent (mol/L)
[b] Calculated from the weight of methanol insoluble portion
[c] Measured by a size exclusion chromatographic method (THF) (in terms of polystyrene)
[d] Measured by $^{13}$C-NMR(DMSO-$d_6$, 80° C.)

Synthesis Example 4

Synthesis of an Optically Active Acrylamide (4) Having an (R) Configuration

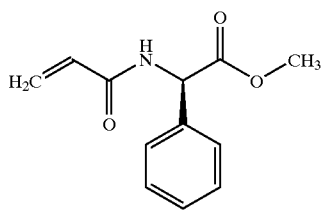

(4)

In a nitrogen exchanged reaction vessel was charged (R)-(−)-phenylglycine methyl ester hydrochloride (16 g) and dry diethyl ether (250 ml) and triethylamine (22.2 ml) were added thereto. The mixture was stirred in an ice bath until dissolution. Thereafter, acrylic chloride (6.4 ml) diluted with dichloromethane (50 ml) was dripped therein in 2 hours. Then the temperature was returned to room temperature and stirring was performed for 24 hours.

After the reaction mixture was washed with a saturated aqueous sodium hydrogen carbonate solution and then with distilled water, the obtained organic layer was dehydrated and the solvent was distilled off under a reduced pressure to obtain a crude product. This was recrystallized from ethyl acetate to obtain the objective compound (4) (white needle-like crystal: 8.6 g, percent yield: 52%). The melting point of the obtained compound is within a range of 110.6 to 111.3° C.

Example 4

Polymerization of an Optically Active Acrylamide (4) Having an (R) Configuration Under a nitrogen atmosphere, in an ampoule were charged 2.0 g of acrylamide (4) and 20 mg of AIBN, which was a polymerization initiator, and a Lewis acid as a catalyst shown in Table 2 was charged in the predetermined amounts described there and 4.0 ml of tetrahydrofuran was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polyacrylamide. The tacticity (m/r) as an index showing the stereoregularity was obtained by measurement by $^1$H-NMR in a solvent of DMSO-$d_6$ at 170° C. The results are shown in Table 2.

Example 5

Polymerization of an Optically Active Acrylamide (4) Having an (R) Configuration Under a nitrogen atmosphere, in an ampoule were charged 500 mg of acrylamide (4) and 5 mg of AIBN, which was a polymerization initiator, and several kinds of a Lewis acid as a catalyst shown in Table 2 were charged, in predetermined amounts described there and 1.0 ml of tetrahydrofuran was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polyacrylamide. The tacticity (m/r) as an index showing the stereoregularity was obtained by measurement by $^1$H-NMR in a solvent of DMSO-$d_6$ at 170° C. The results are shown in Table 2.

Comparative Example 3

Polymerization of an Optically Active Acrylamide (4) Under the Condition That a Lewis Acid is Not Used Under a nitrogen atmosphere, in an ampoule were charged 2.0 g of acrylamide (4) and 20 mg of AIBN, which was a polymerization initiator and, without a Lewis acid being added, 4.0 ml of tetrahydrofuran was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polyacrylamide. The tacticity (m/r) as an index showing the stereoregularity was obtained by measurement by $^1$H-NMR in a solvent of DMSO-$d_6$ at 170° C. The results are shown in Table 2.

TABLE 2

|  | Catalyst | Charge amount[a] (mol/L) | Yield[b] (%) | Mn[c] × 10⁻³ | Mw/Mn[c] | Tacticity[d] m/r |
|---|---|---|---|---|---|---|
| Example 4 | Yb(OTf)$_3$ | 0.27 | 60.3 | 11.7 | 1.58 | 87/13 |
| Example 5 | MgBr$_2$ | 0.20 | 63.8 | 7.75 | 2.53 | 74/26 |
|  | Y(OTf)$_3$ | 0.17 | 76.5 | 16.8 | 1.98 | 80/20 |

TABLE 2-continued

|  | Catalyst | Charge amount[a] (mol/L) | Yield[b] (%) | $Mn^{c)} \times 10^{-3}$ | $Mw/Mn^{c)}$ | Tacticity[d] m/r |
|---|---|---|---|---|---|---|
|  | HfCl$_4$ | 0.22 | 40.8 | 11.6 | 1.75 | 52/48 |
|  | Sc(OTf)$_3$ | 0.24 | 30.7 | 6.40 | 2.18 | 64/36 |
| Comparative Example 3 | Nothing | — | 82.4 | 15.3 | 2.49 | 49/51 |

[a] Catalyst charge amount per 1 L of reaction solvent (mol/L)
[b] Calculated from the weight of methanol insoluble portion
[c] Measured by a size exclusion chromatographic method (THF) (in terms of polystyrene)
[d] Measured by $^{13}$C-NMR(DMSO-d$_6$, 80° C.)

Synthesis Example 5

Synthesis of an Acrylamide (5) as a Racemic Form

(5)

In a nitrogen exchanged reaction vessel was charged α-methylbenzylamine hydrochloride (26 g) as a racemic form and dry diethyl ether (250 ml) and triethylamine (22.2 ml) were added thereto. The mixture was stirred in an ice bath until dissolution. Thereafter, acryl chloride (18 ml) diluted with dichloromethane (50 ml) was dripped therein in 2 hours. Then the temperature was returned to room temperature and stirring was performed for 20 hours.

After the reaction mixture was washed with a saturated aqueous sodium hydrogen carbonate solution and then with distilled water, the obtained organic layer was dehydrated and the solvent was distilled off under a reduced pressure to obtain a crude product. This was recrystallized from ethyl acetate to obtain the objective compound (5) (white needle-like crystal: 29 g, percent yield: 82%). The melting point of the obtained compound is 63.2±0.2° C.

Example 6

Polymerization of an Acrylamide (5) as a Racemic Form

Under a nitrogen atmosphere, in an ampoule were charged 400 mg of acrylamide (5) and 4 mg of AIBN, which was a polymerization initiator, and several kinds of a Lewis acid as a catalyst shown in Table 3 were charged, in predetermined amounts described there and 1.0 ml of tetrahydrofuran was added. After the mixture was stirred, the temperature was elevated to 60° C. and polymerization was started.

After 24 hours from the start of the polymerization, the ampoule was cooled to −78° C. and the polymerization reaction mixture was dripped in methanol. The insoluble matter thus deposited was dried under a vacuum to obtain the objective polyacrylamide. The tacticity (m/r) as an index showing the stereoregularity was obtained by measurement by $^1$H-NMR in a solvent of DMSO-d$_6$ at 170° C. The results are shown in Table 3.

Comparative Example 4

Polymerization of an Acrylamide (5) Under the Condition That a Lewis Acid is Not Used Under a nitrogen atmosphere, in an ampoule were charged 400 mg of an acrylamide (5) and 4 mg of AIBN, which was a polymerization initiator and without a Lewis acid being added, 1.0 ml of tetrahydrofuran was added. After the mixture was stirred, the temperature was elevated to 60° C. and polymerization was started.

After 24 hours from the start of the polymerization, the ampoules were cooled to −78° C. and the polymerization reaction mixture was dripped in methanol. The insoluble matter thus deposited was dried under a vacuum to obtain the objective polyacrylamide. The tacticity (m/r) as an index showing the stereoregularity was obtained by measurement by $^1$H-NMR in a solvent of DMSO-d$_6$ at 170° C. The results are shown in Table 3.

TABLE 3

|  | Catalyst | Charge amount[a] (mol/L) | Yield[b] (%) | Tacticity[c] m/r |
|---|---|---|---|---|
| Example 6 | Yb (OTf)$_3$ | 0.29 | 63.0 | 64/36 |
|  | MgBr$_2$ | 0.20 | 80.6 | 57/43 |
|  | Y (OTf)$_3$ | 0.20 | 90.8 | 64/36 |
|  | HfCl$_4$ | 0.42 | 83.8 | 53/47 |
|  | Sc (OTf)$_3$ | 0.21 | 65.3 | 57/43 |
| Comparative Example 4 | Nothing | — | 92.6 | 45/55 |

[a] Catalyst charge amount per 1 L of reaction solvent (mol/L)
[b] Calculated from the weight of methanol insoluble portion
[c] Measured by $^{13}$C-NMR (DMSO-d$_6$, 80° C.)

What is claimed is:

1. A poly(meth)acrylamide obtained by radical-polymerizing a (meth)acrylamide in the presence of a Lewis acid catalyst, being rich in isotacticity or heterotacticity and having a syndiotacticity of not more than 50%.

2. The poly(meth)acrylamide according to claim 1, wherein the (meth)acrylamide is a (meth)acrylamide represented by the general formula (I):

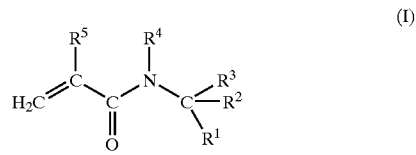
(I)

wherein $R^1$, $R^2$ and $R^3$, which may be the same as or different from one another, represent a hydrogen atom, a monovalent hydrocarbon group having 1 to 30 carbon atoms or a monovalent atomic group including a heteroatom, $R^4$ represents a hydrogen atom or a monovalent hydrocarbon group having 1 to 30 carbon atoms and $R^5$ represents a hydrogen atom or a methyl group.

3. The poly(meth)acrylamide according to claim 2, wherein $R^1$, $R^2$ and $R^3$, which may be the same as or different from one another, represent a hydrogen atom, an alkyl group having 1 to 6 carbon atoms, an aryl group, an aralkyl group, a carbalkoxy group, a carbamoyl group, an amino-substituted alkyl group, an amino group, an alkoxy-substituted alkyl group, an alkoxy group or a silyl group, and $R^4$ represents a hydrogen atom, an alkyl group having 1 to 6 carbon atoms, an aryl group or an aralkyl group.

4. The poly(meth)acrylamide according to claim 2, wherein $R^1$, $R^2$ and $R^3$ are different from one another.

5. The poly(meth)acrylamide according to claim 2, wherein $R^4$ represents a hydrogen atom.

6. The poly(meth)acrylamide according to claim 1, wherein the (meth)acrylamide is an optically active form.

7. The poly(meth)acrylamide according to claim 1, comprising mainly a constituent unit represented by the general formula (II):

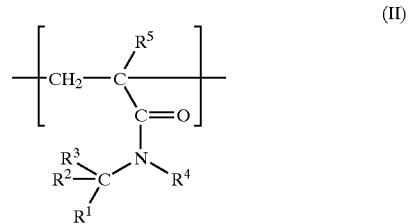

(II)

wherein $R^1$, $R^2$, $R^3$, $R^4$ and $R^5$ have the same meanings as described above, and a degree of polymerization of 5 or more.

8. A process for producing a poly(meth)acrylamide as described in claim 1, comprising radical-polymerizing a (meth)acrylamide in the presence of a Lewis acid catalyst.

9. The process for producing a poly(meth)acrylamide according to claim 8, in which the Lewis acid is a metal Lewis acid.

* * * * *